(12) United States Patent
Schuberg et al.

(10) Patent No.: US 10,824,029 B2
(45) Date of Patent: Nov. 3, 2020

(54) ELECTRICAL CONNECTIONS FOR ELECTRO-OPTIC ELEMENTS

(71) Applicant: Gentex Corporation, Zeeland, MI (US)

(72) Inventors: Kyle R. Schuberg, Holland, MI (US); Joel A. Stray, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 234 days.

(21) Appl. No.: 15/901,156

(22) Filed: Feb. 21, 2018

(65) Prior Publication Data

US 2018/0239201 A1 Aug. 23, 2018

Related U.S. Application Data

(60) Provisional application No. 62/462,564, filed on Feb. 23, 2017.

(51) Int. Cl.
| | |
|---|---|
| *G02F 1/1343* | (2006.01) |
| *G02F 1/155* | (2006.01) |
| *G02F 1/167* | (2019.01) |
| *G02F 1/17* | (2019.01) |
| *B60R 1/04* | (2006.01) |
| *B60R 1/12* | (2006.01) |
| *G02F 1/153* | (2006.01) |

(52) U.S. Cl.
CPC .......... *G02F 1/134309* (2013.01); *B60R 1/04* (2013.01); *B60R 1/12* (2013.01); *G02F 1/13439* (2013.01); *G02F 1/153* (2013.01); *G02F 1/155* (2013.01); *G02F 1/167* (2013.01); *G02F 1/172* (2013.01)

(58) Field of Classification Search
CPC .......... G02F 1/134309; G02F 1/13439; G02F 1/153; G02F 1/155; G02F 1/167; G02F 1/172; G02F 1/157; B60R 1/04; B60R 1/12; B60R 1/088; B60R 1/1207
See application file for complete search history.

(56) References Cited

U.S. PATENT DOCUMENTS

| | | | |
|---|---|---|---|
| 7,310,177 B2 | 12/2007 | McCabe et al. | |
| 2004/0032638 A1* | 2/2004 | Tonar | C09K 9/02 359/265 |
| 2005/0195488 A1* | 9/2005 | McCabe | B60R 1/088 359/603 |

(Continued)

*Primary Examiner* — William R Alexander
*Assistant Examiner* — Ephrem Z Mebrahtu
(74) *Attorney, Agent, or Firm* — Price Heneveld LLP; Bradley D. Johnson

(57) ABSTRACT

A rearview mirror assembly includes a housing. A circuit board is positioned within the housing. A cantilevered contact is coupled with the circuit board. An electro-optic element is positioned proximate the circuit board. A first substantially transparent substrate defines a first surface and a second surface. A first edge extends around the first substrate. A second substantially transparent substrate defines a third surface and a fourth surface. A second edge extends around the second substrate and defines a notch having a notch edge set inboard from the second edge. An electrical bus extends proximate the first and second edges. A primary seal is disposed between the first and second substrates. The seal and the first and second substrates define a cavity therebetween. An electro-optic material is positioned within the cavity.

20 Claims, 2 Drawing Sheets

(56) References Cited

U.S. PATENT DOCUMENTS

| | | | |
|---|---|---|---|
| 2007/0153356 A1* | 7/2007 | McCabe | F21S 43/14 |
| | | | 359/265 |
| 2012/0026571 A1 | 2/2012 | Uken et al. | |
| 2014/0036338 A1* | 2/2014 | Bareman | G02F 1/157 |
| | | | 359/267 |
| 2015/0077828 A1 | 3/2015 | Kukita | |
| 2016/0243987 A1* | 8/2016 | Kendall | B60R 1/04 |

* cited by examiner

ELECTRICAL CONNECTIONS FOR ELECTRO-OPTIC ELEMENTS

CROSS-REFERENCE TO RELATED APPLICATION

This application claims the benefit of and priority to U.S. Provisional Patent Application No. 62/462,564, filed on Feb. 23, 2017, entitled ELECTRICAL CONNECTIONS FOR ELECTRO-OPTIC ELEMENTS, the entire disclosure of which is hereby incorporated herein by reference.

FIELD OF THE DISCLOSURE

The present disclosure generally relates to electro-optic elements, and more particularly, to electrical connections for electro-optic elements.

BACKGROUND OF THE DISCLOSURE

Electro-optic elements are being used in various vehicular and building applications, (e.g., within rearview display devices and variably transmissive windows). Use of these assemblies in various applications can be limited by cost, aesthetic and functional considerations. Accordingly, new electro-optic element designs, configurations and assemblies, along with methods of making them, are needed particularly in view of reducing material and processing costs, improving aesthetics and/or enhancing functionality.

SUMMARY OF THE DISCLOSURE

According to at least one feature of the present disclosure, a rearview mirror assembly includes a housing. A circuit board is positioned within the housing. A cantilevered contact is coupled with the circuit board. An electro-optic element is positioned proximate the circuit board. A first substantially transparent substrate defines a first surface and a second surface. A first edge extends around the first substrate. A second substantially transparent substrate defines a third surface and a fourth surface. A second edge extends around the second substrate and defines a notch having a notch edge set inboard from the second edge. An electrical bus extends proximate the first and second edges. A primary seal is disposed between the first and second substrates. The seal and the first and second substrates define a cavity therebetween. An electro-optic material is positioned within the cavity.

According to another feature of the present disclosure, a rearview mirror assembly includes a circuit board. A cantilevered contact is coupled with the circuit board. An electro-optic element is positioned proximate the circuit board. A first substantially transparent substrate defines a first surface and a second surface. A first edge extends around the first substrate. A second substantially transparent substrate defines a third surface and a fourth surface. An electrical bus extends proximate the first and second edges. A portion of the electrical bus is positioned outboard of the second edge. An electro-optic material is positioned between the first and second substrates. The cantilevered contact is in contact with the portion of the electrical bus positioned outboard of the second edge.

According to another feature of the present disclosure, a rearview mirror assembly includes a circuit board. An electro-optic element is positioned proximate the circuit board. A first substantially transparent substrate defines a first surface and a second surface. A first edge extends around the first substrate. A second substantially transparent substrate defines a third surface and a fourth surface. A second edge extends around the second substrate and defines a notch edge set inboard from the second edge. An electrical bus extends proximate the first and second edges. The electrical bus is positioned outboard of the second edge proximate the notch edge. An electro-optic material is positioned between the first and second substrates.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF EMBODIMENTS

Figure 1:
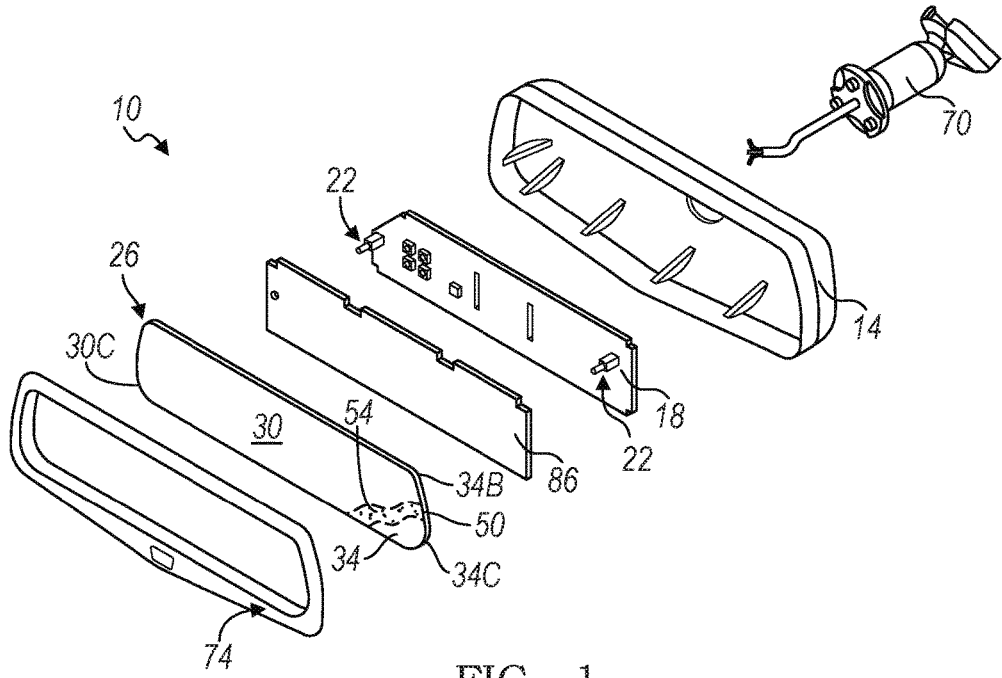
FIG. 1 is a top perspective exploded view of a rearview mirror assembly, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Referring to FIGS. 1-3B, reference numeral 10 generally designates a rearview mirror assembly. The assembly includes a housing 14. A circuit board 18 is positioned within the housing 14. A cantilevered contact 22 is coupled to the circuit board 18. An electro-optic element 26 is positioned proximate the circuit board 18. The electro-optic element 26 includes a first substantially transparent substrate 30 defining a first surface 30A and a second surface 30B. A first edge 30C extends around the first substrate 30. A second substantially transparent substrate 34 defines a third surface 34A and a fourth surface 34B. A second edge 34C extends around the second substrate 34 and may define a notch 38 having a notch edge 38A set inboard from the second edge 34C. An electrical bus 42 extends proximate the first and second edges 30C, 34C. A primary seal 46 is disposed between the first and second substrates 30, 34. The seal 46 and the first and second substrates 30, 34 define a cavity 50 therebetween. An electro-optic material 54 is positioned within the cavity 50.

Referring now to FIG. 1, the illustrated rearview mirror assembly 10 can be an interior rearview assembly positioned within an interior of a vehicle. Though discussed in reference to an automotive vehicle, the rearview mirror assembly 10 and/or electro-optic element 26 may be utilized for various applications including, but not limited to, transit vehicles, nautical vessels, aircraft, etc. When the rearview mirror assembly 10 is an interior rearview assembly, the rearview mirror assembly 10 may be connected to a mount 70, which is adapted to be mounted inside the vehicle in a location proximate to or on a front windshield of the vehicle. It should be noted that the present disclosure is equally applicable to exterior mirrors, as well as other optical assemblies positioned within bezels and housings. Further, the teachings provided herein may be applied to a variety of electro-optic elements 26, both with and without surrounds (e.g., a heads-up display system and/or display screen).

The rearview mirror assembly 10 may include a bezel 74 configured to couple to the housing 14 so as to hold the electro-optic element 26 and the circuit board 18 within the assembly 10. The bezel 74 may be composed of a thermosetting polymer (e.g., a reactive injection molding (RIM) suitable polymer, reinforced RIM suitable polymer, a structural RIM suitable polymer, a castable polymer and combinations thereof) and/or a thermoplastic polymer (e.g., polycarbonate, nylon, acrylic, combinations thereof, etc.). In some examples, the bezel 74 may include a clear polymeric material. The bezel 74 may be formed via machining, casting, resin transfer molding, reactive injection molding, injection molding, and/or compression injection molding.

The first substrate 30 may include a variety of materials transparent in the visible region of the electromagnetic spectrum including soda-lime float glass, EAGLE® glass, alkaline earth boro-aluminosilicate glass, GORILLA® glass, alkali-aluminosilicate glass, chemically strengthened glass, insulated glass, tempered glass, sapphire, optical crystals, diamond, quartz, ceramics, polymers, plastics, resins and/or combinations thereof. The second substrate 34 may include the same materials as the first substrate 30, but does not need to be transparent and therefore may include polymers, metals, glass, ceramics, composites and/or combinations thereof. Similarly to the first substrate 30, the second substrate 34 defines the second edge 34C. The first and second substrates 30, 34 may have a thickness between about 0.1 mm to about 3.0 mm, between about 0.5 mm to about 2.2 mm, or between about 0.8 mm to about 1.6 mm. In some examples, the thicknesses of the first and second substrates 30, 34 may differ from one another. Furthermore, a reflector material may be located on either the third or fourth surfaces 34A, 34B of the second substrate 34, depending upon the type of electro-optic element 26. The first and second substrates 30, 34 may take a variety of shapes including square, rectangular, circular, oblong and combinations thereof. It will be understood that the first and second substrates 30, 34 may have different shapes than one another without departing from the teachings of the present disclosure. According to various examples, the first and/or second substrates 30, 34 may have a curvature across the length or width (i.e., a vertical or horizontal axis).

According to various examples, the first substrate 30 may be wider, larger and/or longer, relative to the second substrate 34 such that an overhang is defined around a portion, a majority, or an entirety of the electro-optic element 26. In other words, the first edge 30C may be positioned outboard over a portion, a majority, or an entirety of the second edge 34C. The overhang may be less than or equal to about 0.5 mm, 0.4 mm, 0.3 mm, 0.2 mm or less than or equal to about 0.1 mm. Further, the overhang may vary in width around the perimeter of the electro-optic element 26. For purposes of this disclosure, a feature which is described as inboard may be closer to, or proximate, a center of the electro-optic element 26 relative to features which are described as outboard, or toward an exterior of the electro-optic element 26. It will be understood that the first and second substrates 30, 34 may be the same size as one another such that no overhang is defined without departing from the teachings provided herein.

The rearview mirror assembly 10 includes the circuit board 18 and a carrier plate 86. The carrier plate 86 can be located behind the electro-optic element 26 and have the circuit board 18 connected thereto. If the rearview mirror assembly 10 is an interior rearview assembly, the carrier plate 86 may be fixed in position within the housing 14. In various examples, the carrier plate 86 may be movable within the housing 14. The carrier plate 86 of the rearview mirror assembly 10 can be used to maintain the position of the electro-optic element 26 and/or carry the circuit board 18. Further, the carrier plate 86 may aid in supporting the cantilevered contact 22 as explained in greater detail below. An example of an interior rearview assembly including a carrier plate and a circuit board is disclosed in U.S. Pat. No. 6,239,899, entitled "MIRROR WITH INTERNAL SUPPORT PLATE," assigned to Gentex Corporation, the entirety of which is hereby incorporated herein by reference. In the rearview mirror assembly 10, the carrier plate 86 assists in maintaining the electro-optic element 26 in position within the housing 14. An example of the housing 14, bezel 74, carrier plate 86, circuit board 18 and their interconnections may be found in U.S. Patent Application Publication No. 2005/0152054 entitled "REFLECTIVE ELEMENT HOLDER FOR REARVIEW MIRROR," assigned to Gentex Corporation, the entirety of which is hereby incorporated herein by reference. However, it is contemplated that the rearview mirror assembly 10 could have a bezel 74 and/or carrier plate 86 omitted from the rearview mirror assembly 10.

The circuit board 18 may be configured to control electrical signals provided to the electro-optic element 26 and/or to one or more displays (e.g., liquid crystal, organic light emitting diode, etc.) located in or proximate to the rearview mirror assembly 10. The circuit board 18 may include one or more daughter boards coupled thereto. The daughter boards may extend in a direction parallel, perpendicular or at angles therebetween, from a face of the circuit board 18. The circuit board 18 may also control electrical signals sent from one or more switches or buttons present on the rearview mirror assembly 10.

As explained above, the circuit board 18 may include one or more cantilevered contacts 22 extending therefrom. The cantilevered contacts 22 are cantilevered in the sense that the contacts 22 may extend in an outward direction away from the circuit board 18 in an unsupported fashion. As such, the contacts 22 are cantilevered. The cantilevered contacts 22 may extend in a direction or orientation substantially perpendicular (e.g., orthogonal), substantially parallel, or angles therebetween, from the circuit board 18. For example, the cantilevered contacts 22 may form an angle of from about 1° to about 90° between a centerline of the contact 22 and a surface of the circuit board 18. Although depicted with a single contact 22 extending from the circuit board 18, it will be understood that two or more contacts 22 may extend from the circuit board 18. Further, in examples utilizing multiple contacts 22, the contacts 22 may be clustered proximate a specific portion of the circuit board 18, or may be homogenously or non-homogenously distributed across the circuit board 18. As will be explained in greater detail below, the cantilevered contacts 22 may be the electrical contact between the circuit board 18 and the electro-optic element 26.

In the depicted example, the electro-optic element 26 has the electro-optic material 54 positioned between the first substrate 30 and the second substrate 34 in the cavity 50. According to at least one example, the electro-optic element 26 may be a liquid crystal device, including a liquid crystal medium (e.g., the electro-optic material 54), configured to attenuate light transmitted through the electro-optic element 26 and/or rearview mirror assembly 10. In another example, the electro-optic element 26 may be a suspended particle device. In some examples, the electro-optic element 26 may be an electrophoretic device. In some examples, the electro-optic material 54 may be an electrochromic material. In such examples, the electro-optic material 54 may be a solution phase material as disclosed in U.S. Pat. No. 4,902,108 entitled "SINGLE-COMPARTMENT, SELF-ERASING, SOLUTION-PHASE ELECTROCHROMIC DEVICES, SOLUTIONS FOR USE THEREIN, AND USES THEREOF" and U.S. Pat. No. 5,278,693 entitled "TINTED SOLUTION-PHASE ELECTROCHROMIC MIRRORS," commonly assigned to Gentex Corporation, both of which are hereby incorporated in their entirety herein. In other examples, the electro-optic material 54 may be in a solid-state. In such a configuration, the electro-optic element 26 discussed herein may be configured to be transitioned between substantially transparent and substantially darkened states.

Figure 2:
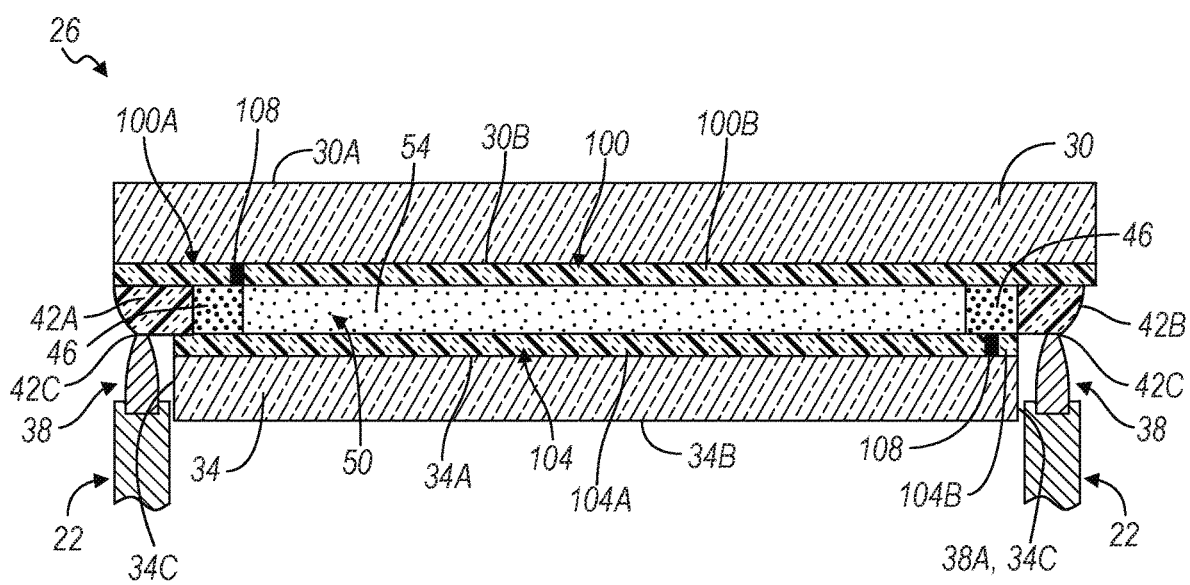
FIG. 2 is a cross-sectional view of an electro-optic element, according to at least one example.

Referring now to FIG. 2, a first electrically conductive layer 100 is positioned on the second surface 30B and a second electrically conductive layer 104 is positioned on the third surface 34A. The first and second electrically conductive layers 100, 104 may include a transparent conductor such as a transparent metal oxide (e.g., indium-tin-oxide, $F:SnO_2$, ZnO, IZO), carbon (graphene and/or graphite) and/or a conductive metal mesh (e.g., nanowires). In indium-tin-oxide examples, the first and second electrically conductive layers 100, 104 may have a sheet resistance of between about 1 ohms/sq and about 100 ohms/sq. The first and second electrically conductive layers 100, 104 may each define an isolation area 108. The isolation area 108 of the first electrically conductive layer 100 separates the first electrically conductive layer 100 into a first portion 100A and a second portion 100B. The first and second portions 100A, 100B may be electrically isolated from one another. The isolation area 108 of the second electrically conductive layer 104 separates the second electrically conductive layer 104 into a third portion 104A and a fourth portion 104B which may be electrically isolated from one another. According to various examples, a spectral filter, or chrome ring, may be utilized to obscure the isolation area 108 and/or the notch 38 as described in greater detail below.

The first and second substrates 30, 34 can be positioned in a parallel relationship and sealed around the perimeter using the primary seal 46 to define the cavity 50. The seal 46 extends around the second and third surfaces 30B, 34A to confine the electro-optic material 54 between the first and second substrates 30, 34. The seal 46 may be positioned proximate to, or in contact with, the isolation areas 108. Additional information related to forming a seal between a first and second substrate can be found in U.S. Pat. No. 5,790,298, entitled "METHOD OF FORMING OPTICALLY TRANSPARENT SEAL AND SEAL FORMED BY SAID METHOD," which is hereby incorporated herein by reference in its entirety. The cavity 50 may have a spacing between the first and second substrates 30, 34 of less than or equal to about 500 µm, 400 µm, 300 µm, 200 µm, 100 µm, 90 µm, 75 µm, 50 µm, 40 µm, 35 µm, or less than or equal to about 20 µm.

Figure 3A:
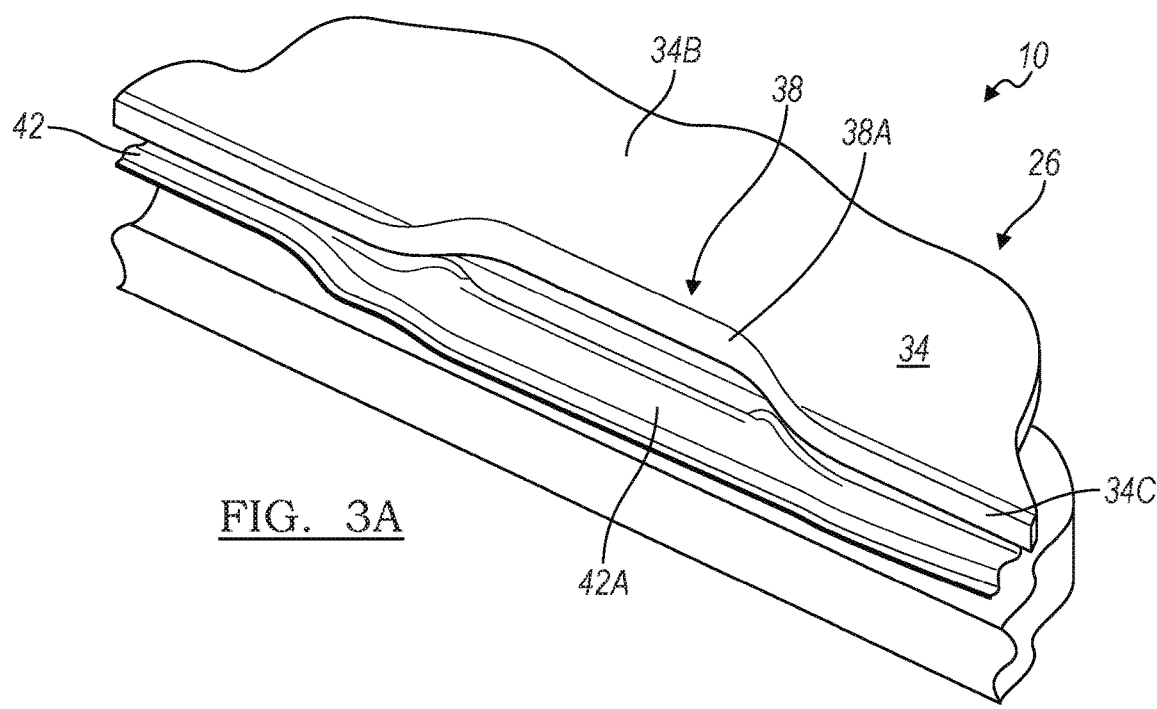
FIG. 3A is a rear perspective view of an electro-optic element of the rearview mirror assembly of FIG. 1, according to at least one example.
Figure 3B:
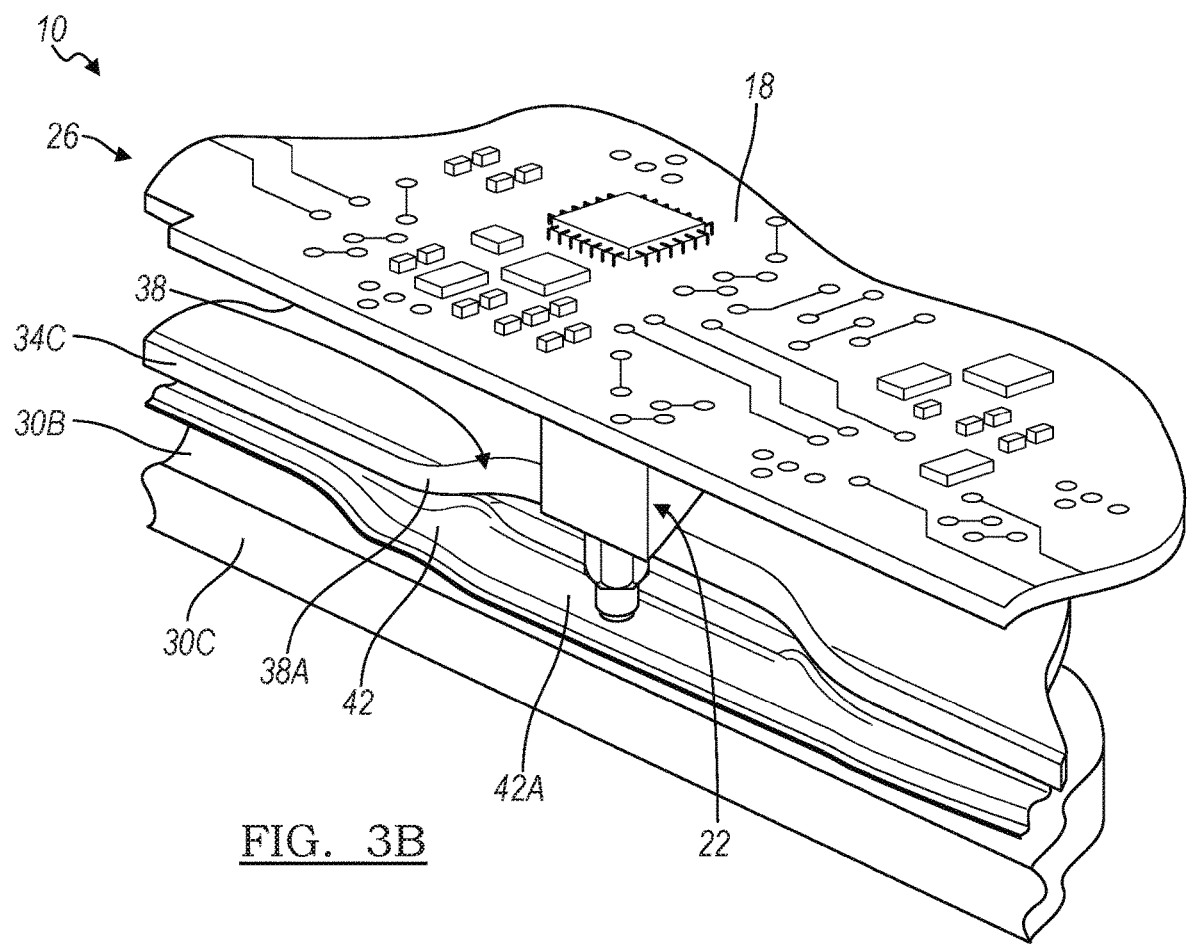
FIG. 3B is a rear perspective view of the electro-optic element of FIG. 1 with an electrical contact, according to at least one example.

Referring now to FIGS. 2, 3A and 3B, the electrical bus 42 is positioned outboard of the seal 46 and between the first and second substrates 30, 34. The electrical bus 42 may be formed from an electrically conductive material, conductive solder, a conductive epoxy (e.g., silver epoxy), a wire and/or combinations thereof. In a silver epoxy example of the electrical bus 42, the electrical bus may contain a one or two part polymeric epoxy which has a plurality of silver particles disposed therein to render the silver laden epoxy electrically conductive. In the depicted example, the electrical bus 42 includes a first bus portion 42A and a second bus portion 42B. The first and second bus portions 42A, 42B may be electrically connected or isolated from one another. The first and second bus portions 42A, 42B each extend around a portion of a perimeter of the electro-optic element 26.

According to various examples, the electrical bus 42 is positioned outboard of the notch 38 and the notch edge 38A proximate the notch 38. In other words, the notch edge 38A may be positioned inboard of the electrical bus 42. For example, the notch edge 38A may be positioned over the seal 46. Further, the electrical bus 42 may be positioned outboard of the second edge 34C proximate the notch 38. Positioning of the electrical bus 42 outboard of the notch 38 and/or the second edge 34C may be advantageous for a variety of reasons. For example, by positioning the electrical bus 42 outboard of the second edge 34C, wetting of the electrical bus 42 to the second substrate 34 may be minimized or prevented which may give rise to a non-aesthetically pleasing appearance to the electrical bus 42. Further, by positioning the electrical bus 42 outboard of the notch 38 and notch edge 38A, an increased contact area for the cantilevered contact 22 to electrically connect with the electrical bus 42 may be achieved. It will be understood that only a portion of the electrical bus 42 may be positioned outboard of the notch 38 and/or notch edge 38A. Additionally or alternatively, the electrical bus 42 may be wider proximate the contact area for the cantilevered contact 22. The contact area of the electrical bus 42 may be planar, or flat, while the remainder of the electrical bus 42 may be rounded. For example, electrical bus 42 may define a contoured (e.g., flat, curved and or other shapes configured to contact the cantilevered contact 22) surface 42C to which the contact 22 makes contact. The electrical bus 42 may have a width of less than or equal to about 4 mm, 3.5 mm, 3.0 mm, 2.5 mm, 2.0 mm, 1.8 mm, 1.5 mm or less than or equal to about 1.0 mm. It will be understood that the electrical bus 42 may be positioned outboard of the second edge 34C in examples of the electro-optic element 26 does not have the notch 38. In other words, a portion of the electrical bus 42 is positioned outboard of the second edge 34C of the second substrate. In such examples, many of the above and below noted advantages (e.g., related to ease of connection between the circuit board 18 and the electro-optic element 26) may be obtained without the need to form the notch 38.

Still referring to FIGS. 2, 3A and 3B, the second substrate 34 and the second edge 34C cooperate to define the notch 38 and the notch edge 38A. The second edge 34C of the electro-optic element 26 may define one, two or greater than two notches 38. As explained above, the notch 38 allows the cantilevered contact 22 to contact the electrical bus 42. The cantilevered contacts 22 may have a spring-compression curve that allows an operation within a wide range of mechanical displacement without creating an excessive compression force. The cantilevered contact 22 may contact the electrical bus 42 with a force of less than or equal to about 5.0 N, 4.5 N, 4.0 N, 3.5 N, 3.0 N, 2.5 N, 2.0 N, 1.5 N, 1.0 N, 0.5 N, 0.1 N or less than or equal to about 0.01 N.

The cantilevered contacts 22 may be a spring contact, a pogo-pin contact, a conductive polymeric structure (e.g., a polymer coated with a conductive metal and/or a polymer doped with a conductive metal) or combinations thereof. As such, the cantilevered contacts 22 may be flexible in an X-, Y- or Z-direction. In conductive polymeric structure examples, the metal may be silver, nickel, copper, gold, palladium and/or combinations thereof. The conductive polymeric structure may be co-molded into shape during a circuit board 18 holder manufacturing process or may be pre-molded (e.g., by extrusion into a cylinder) and inserted, as a separate element, into a passage through the circuit board 18. In spring contact examples of the cantilevered contacts 22, the contacts 22 may be coil springs, flat springs, leaf springs, combinations thereof and similar contacts 22. Spring contact examples of the cantilevered contact 22, the spring may flex, or deflect, allowing relative movement between the circuit board 18 and the electro-optic element 26. In examples of the contacts 22 including a pogo-pin, the pogo-pin may be a slender cylinder containing a spring-loaded pin which allows a head of the pin to be positioned at any point within a predetermined range. Pogo-pin examples of the cantilevered contacts 22 may be advantageous in allowing the circuit board 18 and the electro-optic element 26 to flex relative to one another without losing electrical connection. The cantilevered contacts 22 may be co-molded within the housing 14 or may freely extend from the circuit board 18. The cantilevered contacts 22 may be plated with silver, tin, gold, platinum, other electrically conductive materials and/or combinations thereof. Use of the cantilevered contact 22 may be advantageous in allowing a remote connection between the circuit board 18 and the electro-optic element 26. In other words, use of the cantilevered contact 22 allows the electrical connection between the board 18 and the element 26 to get out away from the footprint of the board 18. It will be understood that the cantilevered contacts 22 include any of the electrical connectors as disclosed in U.S. Pat. No. 9,134,585 entitled "AUTOMOTIVE REARVIEW MIRROR WITH CAPACITIVE SWITCHES" assigned to Gentex Corporation, which is hereby incorporated in its entirety herein.

The interface between the contoured surface 42C and the cantilevered contact 22 may be shaped and tailored to provide both a robust electrical connection between the circuit board 18 and the electro-optic element 26 and a low resistance connection. The contoured surface 42C of the electrical bus 42 may be convex, flat and/or concave. In concave examples of the contoured surface 42C, it may be said that the contoured surfaces defines a well. A tip of the cantilevered contact 22 which contacts the contoured surface 42C may have a shape which is the same, different and/or complimentary to the shape of the contoured surface 42C. For example, in a complimentary shape interface, the tip of the cantilevered contact 22 may be rounded and the contoured surface 42C may be concave such that the contoured surface 42C accepts partial insertion of the cantilevered contact 22 into the electrical bus 42. In another example, the tip of the cantilevered contact 22 may be concave and the contoured surface 42C may be convex such that the tip of the contact 22 mates and securely sits on the contoured surfaces 42C. In examples where the same shape is used for the interface, the contoured surfaces 42C and the tip of the contact 22 may each have a flat shape such that sufficient electrical contact is made between the two. In yet other examples, both the tip of the contact 22 and the contoured surface 42C may have a generally convex shape such that the contact interface has a generally round or round shape.

The shapes of the cantilevered contact 22 and the contoured surface 42C of the electrical bus 42 at the interface may be chosen based on the configuration which yields the lowest electrical resistivity while providing a durable connection. The resistivity of the interface between the contact 22 and the contoured surface 42C may be about 10 ohms or less. For example, the resistivity between the contact 22 and the surface 42C may be about 10 ohms or less, about 9 ohms or less, about 8 ohms or less, about 7 ohms or less, about 6 ohms or less, about 5 ohms or less, about 4 ohms or less, about 3 ohms or less, about 2 ohms or less, about 1 ohms or less, about 0.5 ohms or less, about 0.3 ohms or less, about 0.2 ohms or less or about 0.1 ohms or less.

The notches 38 may be positioned on the same side, or different sides of the second substrate 34. In examples where the notches 38 are positioned on a single side of the second substrate 34, the notches 38 may be positioned proximate one another or may be spaced apart. The second edge 34C of the second substrate 34 may define one notch 38, two notches 38, or three or more notches 38. It will be understood that the circuit board 18 may include as many cantilevered contacts 22 as there are notches 38 or a different amount. For example, a single notch 38 may allow two cantilevered contacts 22 to contact separate electrical busses 42. In other words, both the first and second electrical bus portions 42A, 42B may be exposed in the notch 38. The notches 38 define the notch edges 38A. The notches 38 may have a depth (e.g., as measured from the second edge 34C to the notch edge 38A) of less than or equal to about 10 mm, about 9 mm, about 8 mm, about 7 mm, about 6 mm, about 5 mm, about 4 mm, about 3 mm, about 2 mm or less than or equal to about 1 mm. The depth of the notches 38 may be measured as the distance between a maximum depth of the notch 38 and the second edge 34C. The notches 38 may have a length or width, of less than about 16 mm, about 15 mm, about 14 mm, about 13 mm, about 12 mm, about 11 mm, about 10 mm, about 9 mm, about 8 mm, about 7 mm, about 6 mm, about 5 mm, about 4 mm, about 3 mm, about 2 mm or less than or equal to about 1 mm. The length of the notches 38 may be measured as the distance between the ends of the second edge 34C. The notch edges 38A of the notches 38 may have a lead in and a lead out radius. In other words, the notches 38 may have curved ends. It will be understood that the notches 38 may additionally or alternatively be configured as holes or vias through the second substrate 34. In yet other examples, the notches 38 may take a variety of shapes. For example, the notches 38 may be generally square, rectangular, semicircular, oval, triangular, or higher-order polygons. It will be understood that in examples of the electro-optic element 26 which include a plurality of notches 38, each of the notches may be different or the same.

Use of the present disclosure may offer a variety of advantages. First, use of the cantilevered contacts 22 allows the circuit board 18 to make a remote connection with the electrical bus 42 of the electro-optic element 26. In other words, it allows the contact to reach out from a footprint of the circuit board 18. Second, use of the notches 38 allows for discrete and small footprint size electrical contact locations for the electro-optic element 26. Third, positioning the electrical bus 42 outboard of the notches 38 and notch edges 38A allows for an increased contact area for the cantilevered contact 22 as well as prevents wetting of the electrical bus 42 to the second substrate 34. Fourth, as the distance between the circuit board 18 and the electro-optic element 26 may vary within a prescribed range (e.g., tolerances and/or from force applied to the assembly 10), use of the flexible cantilevered contacts 22 may allow for a consistent and stable electrical connection. Further, flexibility of the cantilevered contacts 22 increases the likelihood that forces to not damage the contacts 22, electro-optic element 26 and/or the circuit board 18. Fifth, use of the cantilevered contacts 22, with our without the notch 38, may allow for the elimination of "J" clips and/or other electrical connections which extend onto the fourth surface 34B of the electro-optic element 26.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A rearview mirror assembly, comprising:
   a housing;
   a circuit board positioned within the housing;
   a cantilevered contact coupled with the circuit board; and
   an electro-optic element positioned proximate the circuit board, comprising:
   a first substantially transparent substrate defining a first surface and a second surface, wherein a first edge extends around the first substrate;
   a second substantially transparent substrate defining a third surface and a fourth surface, wherein a second edge extends around the second substrate, between the third surface and the fourth surface, and wherein the second substrate includes a notch defined between the third and fourth surfaces, the notch having a notch edge set inboard from the second edge;
   an electrical bus extending proximate the first and second edges;
   a primary seal disposed between the first and second substrates, the seal and the first and second substrates defining a cavity therebetween; and
   an electro-optic material positioned within the cavity.

2. The rearview mirror assembly of claim 1, wherein the cantilevered contact is a spring connection.

3. The rearview mirror assembly of claim 1, wherein the cantilevered contact is a pogo-pin.

4. The rearview mirror assembly of claim 1, wherein the electrical bus is positioned outboard of the notch proximate the notch.

5. The rearview mirror assembly of claim 4, wherein the electrical bus is positioned outboard of the notch edge proximate the notch.

6. The rearview mirror assembly of claim 5, wherein the electrical bus is positioned outboard of the second edge proximate the notch.

7. The rearview mirror assembly of claim 1, wherein the electrical bus comprises a silver epoxy.

8. A rearview mirror assembly, comprising:
   a circuit board;
   a cantilevered contact coupled with the circuit board; and
   an electro-optic element positioned proximate the circuit board, comprising:

a first substantially transparent substrate defining a first surface and a second surface, wherein a first edge extends around the first substrate;

a second substantially transparent substrate defining a third surface and a fourth surface, and a second edge extending between the third surface and the fourth surface, wherein the second edge extends around the second substrate, and wherein the second substrate includes a notch defined between the third and fourth surfaces, the notch having a notch edge set inboard from the second edge;

an electrical bus extending proximate the first and second edges, wherein a portion of the electrical bus is positioned outboard of the second edge; and an electro-optic material positioned between the first and second substrates, wherein the cantilevered contact extends beyond the fourth surface of the second substrate and is in contact with the portion of the electrical bus positioned outboard of the second edge.

9. The rearview mirror assembly of claim 8, wherein the cantilevered contact contacts a substantially flat surface defined by the electrical bus.

10. The rearview mirror assembly of claim 8, wherein the cantilevered contact has a substantially perpendicular orientation relative to the second substrate.

11. The rearview mirror assembly of claim 8, wherein the first substrate is larger than the second substrate to define an overhang.

12. The rearview mirror assembly of claim 8, wherein the electrical bus is positioned between the first and second substrates.

13. The rearview mirror assembly of claim 8, wherein the notch edge is positioned inboard of the electrical bus.

14. A rearview mirror assembly, comprising:
a circuit board; and
an electro-optic element positioned proximate the circuit board, comprising:
a first substantially transparent substrate defining a first surface and a second surface, wherein a first edge extends around the first substrate;
a second substantially transparent substrate defining a third surface and a fourth surface, wherein a second edge extends around the second substrate, between the third surface and the fourth surface, and wherein the second substrate includes a notch defined between the third and fourth surfaces, the notch having a notch edge that is set inboard from the second edge;
an electrical bus extending proximate the first and second edges, wherein the electrical bus is positioned outboard of the second edge, proximate the notch edge; and
an electro-optic material positioned between the first and second substrates.

15. The rearview mirror assembly of claim 14, wherein the notch defines curved ends.

16. The rearview mirror assembly of claim 14, wherein a length of the notch is less than or equal to about 10 mm.

17. The rearview mirror assembly of claim 16, wherein a depth of the notch is less than or equal to about 8 mm from the second edge.

18. The rearview mirror assembly of claim 14, further comprising:
a cantilevered contact extending from the circuit board and in contact with the electrical bus.

19. The rearview mirror assembly of claim 18, wherein the cantilevered contact contacts a contoured surface defined by the electrical bus.

20. The rearview mirror assembly of claim 19, wherein the cantilevered contact has a substantially perpendicular orientation relative to the circuit board.

* * * * *